(12) United States Patent
Rentschler et al.

(10) Patent No.: US 8,114,513 B2
(45) Date of Patent: Feb. 14, 2012

(54) UV-CURABLE UNDERCOAT

(75) Inventors: Thomas Rentschler, Krefeld (DE);
Horst Van Beek, Duisburg (DE);
Reinhold Kopp, Kevelaer (DE)

(73) Assignee: Sachtleben Chemie GmbH, Duisburg (DE)

( * ) Notice: Subject to any disclaimer, the term of this patent is extended or adjusted under 35 U.S.C. 154(b) by 579 days.

(21) Appl. No.: 12/295,634

(22) PCT Filed: Apr. 27, 2007

(86) PCT No.: PCT/EP2007/054153
§ 371 (c)(1),
(2), (4) Date: Oct. 1, 2008

(87) PCT Pub. No.: WO2007/125098
PCT Pub. Date: Nov. 8, 2007

(65) Prior Publication Data
US 2009/0169783 A1   Jul. 2, 2009

(30) Foreign Application Priority Data

Apr. 27, 2006  (DE) .......................... 10 2006 020 263

(51) Int. Cl.
*B32B 5/16* (2006.01)
(52) U.S. Cl. ..... 428/330; 427/492; 427/517; 427/407.1; 427/408; 427/409; 427/412.1; 427/419.1; 427/514; 427/385.5; 427/256; 427/558; 522/81; 522/83; 522/74; 522/95; 522/96; 428/457; 428/458; 428/461; 428/460

(58) Field of Classification Search .................. 427/492, 427/517, 407.1, 408, 409, 412.1, 419.1, 514, 427/385.5, 256, 558; 522/81, 83, 74, 95, 522/96; 428/457, 458, 461, 460, 330
See application file for complete search history.

(56) References Cited

U.S. PATENT DOCUMENTS

| | | | |
|---|---|---|---|
| 6,500,534 B1 | 12/2002 | Dittfurth et al. | |
| 6,620,514 B1 | 9/2003 | Arpac et al. | |
| 6,632,897 B1 | 10/2003 | Geitner et al. | |
| 6,844,029 B2 * | 1/2005 | Okada et al. ................. | 427/492 |
| 7,169,877 B2 | 1/2007 | Baumgart et al. | |
| 2003/0185990 A1 | 10/2003 | Bittner et al. | |
| 2006/0093755 A1 | 5/2006 | Bittner et al. | |

FOREIGN PATENT DOCUMENTS

| | | |
|---|---|---|
| CA | 2079498 | 4/1993 |
| CA | 2329731 | 10/1999 |
| DE | 4133290 | 4/1993 |
| DE | 19540623 | 5/1997 |
| DE | 19726829 | 1/1999 |
| DE | 102004010201 | 7/2005 |
| EP | 1179575 | 2/2002 |
| JP | 63 120775 A | 5/1988 |
| WO | WO 99/52964 | 10/1999 |
| WO | WO 99/54412 | 10/1999 |
| WO | WO 00/35599 | 7/2000 |
| WO | WO 02/26852 | 4/2002 |
| WO | WO 2005/054380 A | 6/2005 |

\* cited by examiner

*Primary Examiner* — Michael C Miggins
(74) *Attorney, Agent, or Firm* — Fulbright & Jaworski L.L.P.

(57) ABSTRACT

A UV-curable undercoat that contains barium sulfate, production thereof, methods of coating substrates with the undercoat and the coated substrates.

Figure 1:
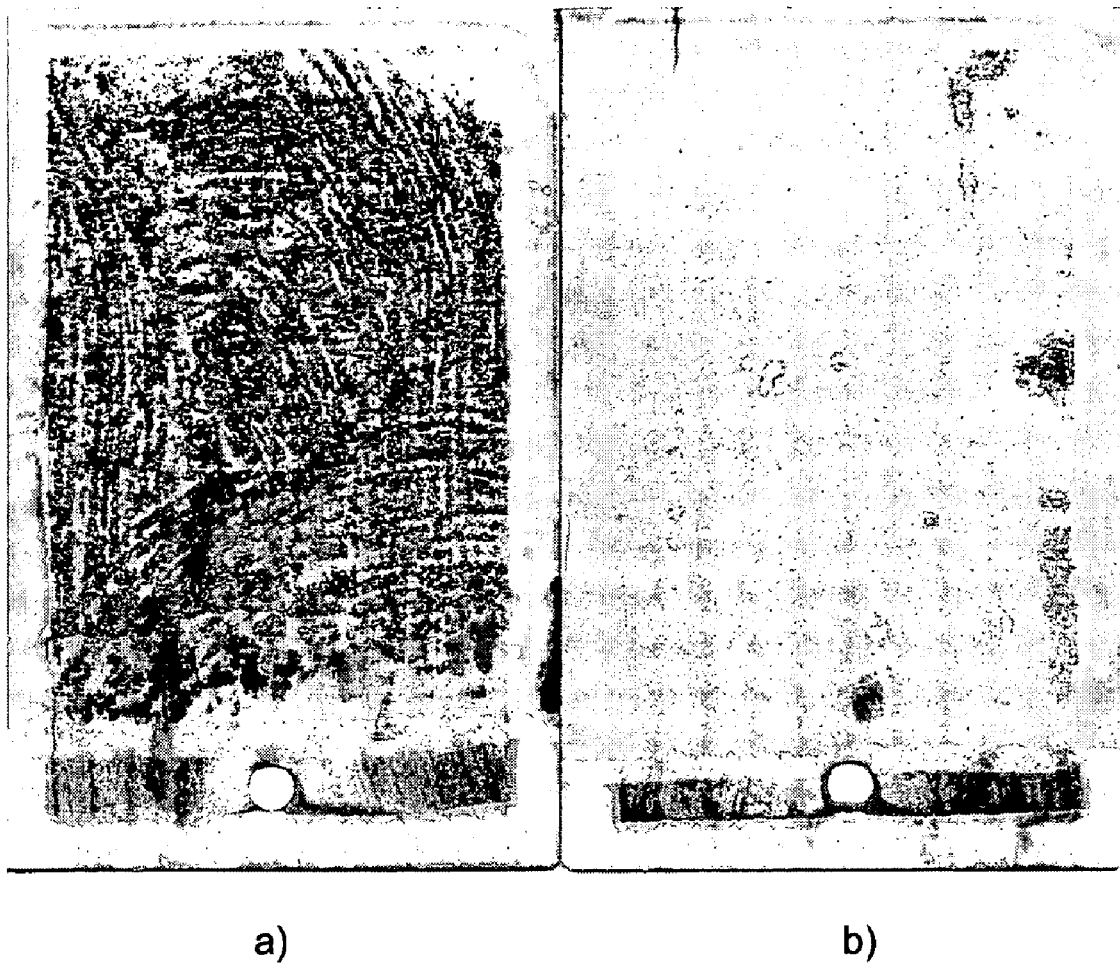

22 Claims, 22 Drawing Sheets a)                                    b)

a) b)

a)  b)  c)

d)  e)

a) b)

a) b)

a)
 b)
 c)
 d)

a) b)

c) d)

a)

b)

c)

d)

a)

b)

c)

a)

b)

c)

a)
b)

c)

a) b)

c)

UV-CURABLE UNDERCOAT

This application is a §371 of PCT/EP2007/054153 filed Apr. 27, 2007, which claims priority from German Patent Application No. 10 2006 020 263.5 filed Apr. 27, 2006.

The present invention provides a UV-curing primer the production thereof and the use of this primer.

In particular, the present invention provides a UV-curing primer for coil coating, which contains fine-particle barium sulfate, the production of this primer and its use.

The term coil coating means a special form of roller coating of cold-rolled metal strip. It involves a continuously operating process with throughput rates of up to 250 m/min. Under these conditions it is necessary for a primer to have very good flow and to cure rapidly so that a strip coating line can be kept as short as possible. UV curing is therefore preferable to heat curing. Since the metal strip is coiled after processing, the primer must be highly elastic.

The primer is the first coat in a multi-coat system and serves to promote the adhesion of the entire coat construction. In the case of coil coating, it should additionally offer the highest possible corrosion protection for the metal strip and the sheets produced therefrom. The primer should also be completely or partly free from chromate-containing anti-corrosive pigments; these are ecologically unsound. In addition, it is desirable to be able to dispense with an organic pretreatment of the metal strip.

The prior art in the area of coil coating primers comprises in particular primers based on acrylates, and in particular primers based on epoxy acrylates, urethane acrylates or mixtures of these. Thus, for example, a known coil coating primer consists substantially of 90 parts acrylate binder, 5 parts Ebecryl 171 adhesion promoter and 5 parts Additol CPK UV initiator Primers based on this and similar compositions have the disadvantages of low corrosion protection and adhesion. Presumably as a result of the high elasticity of coatings with these and similar starting formulations which enable moisture and salts to penetrate to the metal, the corrosion protection is poor. However, high elasticity is extremely important in the coil coating sector because the metal strip is bent, or coiled. The primers have to yield to these mechanical stresses without cracking.

Curable compositions containing fine particles, particularly nanoparticles based on silicon dioxide or aluminium oxide, have also been known for a long time. Reference is made, by way of example, to the patent applications EP-A-1 179 575, WO-A-00/35599, WO-A-99/52964, WO-A-99/54412, DE-A-197 26 829 or DE-A-195 40 623. They are used in particular to produce highly scratch-resistant coatings, the chemical resistance of which, however, leaves something to be desired.

From DE-A-10 2004 010 201, curable compositions are known which contain deagglomerated barium sulfate containing at least one dispersant and at least one crystallisation inhibitor. These curable compositions have high scratch resistance and improved chemical resistance. However, the compositions disclosed in DE-A-10 2004 010 201, which may be used particularly in paints, are heat-cured.

WO-A-02/26852 discloses UV-curing coating compounds which contain barium sulfate, but without disclosing anything about the particle size of the barium sulfate. These coating compounds are used for the production of, among other things, clear lacquer coatings or coloured and special-effect one-coat finish coatings, base coats and multi-coat systems in coil coating. However, WO-A-02/26852 does not disclose a primer.

A particle size of barium sulfate that may be used in UV-curing paints, namely less than 200 nm, is disclosed by DE-A-4133290. However, DE-A-4133290 also fails to disclose a primer and the particle size of the barium sulfate is only roughly outlined. A use of the clear lacquer disclosed in DE-A-4133290 in coil coating is not disclosed.

No UV-curing primer that has very good flow, is highly elastic, offers very good corrosion protection and is completely or partly free from chromate-containing anticorrosive pigments and makes an organic pretreatment of the metal strip superfluous can be found in the prior art.

The object of the present invention is to remedy the deficiency in the prior art.

In particular, the object of the present invention is to provide a UV-curing primer for coil coating which guarantees improved flow, which can dispense completely or partly with chromate-containing anti-corrosive pigments, the use of which makes it possible to dispense with an organic pretreatment of the metal strip, which brings about improved corrosion protection and/or which possesses high elasticity.

According to the invention, the objects are surprisingly achieved by the features of the main claim. Preferred embodiments are found in the subclaims.

In particular, the object is achieved by a UV-curing primer which contains fine-particle barium sulfate with an average particle size of 550 to 950 nm, preferably of 600 to 800 nm, particularly preferably of 650 to 750 nm, or an average particle size of 10 to 120 nm, preferably of 20 to 100 nm, particularly preferably of 30 to 80 nm, most particularly preferably of 40 to 60 nm. This is surprising, since barium sulfate is considered to be chemically inert.

In connection with the barium sulfate used according to the invention, average particle size always means the median of the particle diameter. The median can be determined e.g. by laser diffraction.

A primer of this type has not been known from the prior art up to the present.

Completely surprisingly, as a result of the primer according to the invention, corrosion protection is significantly improved for the metal strip and the sheets produced therefrom without the elastic properties of the primer suffering. Up to the present, it has not been possible to improve both properties simultaneously to this extent. The surface to be treated with the primer, be it the metal strip, the sheets produced therefrom or another surface which can be treated with the primer, will be referred to below for short as the substrate.

With the primer according to the invention it is possible to dispense with anti-corrosive pigments, or at least to reduce their use, without this leading to a reduction in corrosion protection.

In addition, when the primer according to the invention is used, it is possible to dispense with the organic pretreatment of the substrate.

The primer according to the invention contains preferably 40 to 80 wt. % binders, 20 to 45 wt. % reactive thinners, 2 to 10 wt. % UV initiators, 1 to 25 wt. %, preferably 2 to 15 wt. %, particularly preferably 5 to 12 wt. % barium sulfate, 0 to 10 wt. % additives, 0 to 15 wt. % coloured pigments and 0 to 15 wt. % anti-corrosive pigments.

In the case of the barium sulfate used in the primer according to the invention, it is possible to dispense with the use of dispersants and crystallisation inhibitors, in contrast to the barium sulfates disclosed in DE-A-10 2004 010 201.

The barium sulfate in the primer according to the invention has an average particle size of 550 to 950 nm, preferably of 600 to 800 nm, particularly preferably of 650 to 750 nm. An example of a barium sulfate of this type is the product SACHTLEBEN micro from Sachtleben Chemie GmbH. In an alternative embodiment according to the invention, the barium sulfate has an average particle size of 10 to 120 nm, preferably of 20 to 100 nm, particularly preferably of 30 to 80 nm, most particularly preferably of 40 to 60 nm. An example of a barium sulfate of this type is the product SACHTOPERSE HU-N from Sachtleben Chemie GmbH.

The barium sulfate according to the invention is preferably a so-called BLANC FIXE product. This is produced synthetically by a precipitation process. In this process, contaminants are largely eliminated and a narrow, defined particle size and particle size distribution are established. The precipitated barium sulfate is washed, dried and ground. The grinding can take place using pin mills or jet milling. The barium sulfate according to the invention can be coated with an organic substance which acts as a grinding aid during production and as a dispersing aid in the coating. Organic substances typically used are TMP (trimethylolpropane), TME (trimethylolethane), TEA (triethylene amine) or polyacrylates. Alternatively, the barium sulfate according to the invention may originate from natural raw materials, which has been worked up by processes according to the prior art, e.g. cleaning and grinding.

According to the invention, compounds preferably used as binders are those with a UV-curing acrylate or methacrylate function or several UV-curing acrylate or methacrylate functions, preferably selected from epoxy acrylates, polyurethane acrylates, melamine acrylates, polyester acrylates, polyether acrylates, silicone acrylates, epoxy methacrylates, polyurethane methacrylates, melamine methacrylates, polyester methacrylates, polyether methacrylates, silicone methacrylates, unsaturated acrylic, methacrylic or polyester resins or mixtures of at least two of these compounds.

Preferred as reactive thinners according to the invention are styrene, mono-, di-, tri- or tetrafunctional acrylates or mono-, di-, tri- or tetrafunctional methacrylates or mixtures of at least two of these. Reactive thinners are thinners for reducing the viscosity of the binders and become a component of the binder during film formation by a chemical reaction, i.e. they copolymerise. They are usually structurally related monomers of the binder.

The UV initiator according to the invention is preferably selected from benzophenone, benzoin ether, benzil, benzil ketal, α-hydroxyalkylphenone, α-aminoalkylphenone, benzoyl phosphine oxide or derivatives thereof. Mixtures of two or more of these compounds are also often used to optimise reactivity and in-depth cure. The use of the UV initiator is adapted to the binder here.

Adhesion promoters are preferably used according to the invention as additives.

The primer according to the invention can contain inorganic or organic colorants for colouring and covering the substrate, for example white pigments, coloured pigments, black pigments or dyes. In the case of primers intended to give transparent coatings, no colouring substance is added.

Preferably according to the invention, the anti-corrosive pigments that may be used in the primer according to the invention are organic inhibitors or inorganic anti-corrosive pigments, e.g. metal phosphates, metal phosphosilicates or ion-exchange pigments, or mixtures of these compounds.

Advantageously, the UV-curing primer according to the invention can also be produced by adding and incorporating barium sulfate according to the invention into a commercial UV-curing primer by processes according to the prior art.

The primer according to the invention is preferably used for coil coating to protect the substrate from corrosion and/or to achieve uniform flow of the coating on the substrate.

Other uses according to the invention are can coating and container coating. Here too, the primer according to the invention is used to protect the respective substrate from corrosion and/or to achieve uniform flow of the coating on the substrate.

Typical substrates on which the primer according to the invention is used consist for example of steel or aluminium, again for example in the form of sheets. The steel can be used without metallic pre-modification or with electrolytic galvanisation or with a hot-dip finish, e.g. with zinc.

In addition, the substrates of steel or aluminium may be pretreated with organic chemicals for corrosion protection. According to the invention, however, it is also possible to dispense with the pretreatment of the substrates using organic chemicals.

After the UV-curing primer according to the invention has been applied and completely cured with UV light, it may optionally be coated with a heat-curing top coat, e.g. based on a polyester, polyester-melamine, polyurethane or PVDF binder system. The coating is preferably applied by roller or flood coating methods of application.

Furthermore, the UV-curing primer according to the invention can be used e.g. for the coating of planar objects such as wooden boards, fibreboards such as MDF (medium-density fibreboard), laminates, paper and/or films.

Typical applications of the substrates coated with the UV-curing composition according to the invention are e.g. add-on parts for roofs and facades, partition walls, ceiling elements, shop fittings, cupboards, shelves, domestic appliances, machine casings, doors, gates, lights, wheel rims, add-on parts for car bodies and caravans.

The present invention provides in detail:
a UV-curing primer which contains barium sulfate;
a UV-curing primer which contains barium sulfate, this being a mixture, preferably a dispersion;
a UV-curing primer which contains barium sulfate, wherein the barium sulfate has an average particle size of 10 to 120 nm, preferably of 20 to 100 nm, particularly preferably of 30 to 80 nm, most particularly preferably of 40 to 60 nm;
a UV-curing primer which contains barium sulfate, wherein the barium sulfate has an average particle size of 550 to 950 nm, preferably of 600 to 800 nm, particularly preferably of 650 to 750 nm;
a UV-curing primer contains 1 to 25 wt. %, preferably 2 to 15 wt. %, particularly preferably 5 to 12 wt. % barium sulfate;
a UV-curing primer which contains barium sulfate as well as binder(s), UV initiator(s), reactive thinner(s), optionally additive(s), optionally coloured pigments and/or optionally anti-corrosive agents;
a UV-curing primer which contains 40 to 80 wt % binders, 20 to 45 wt % reactive thinners, 2 to 10 wt. % UV initiators, 1 to 25 wt. %, preferably 2 to 15 wt. %, particularly preferably 5 to 12 wt. % barium sulfate, 0 to 10 wt % additives, 0 to 15 wt. % coloured pigments and 0 to 15 wt. % anti-corrosive agents;
a UV-curing primer free from chromate-containing anti-corrosive pigments;
a UV-curing primer wherein, as binders, compounds are used which have one or more UV-curing acrylate or methacrylate functions, preferably selected from epoxy acrylates, polyurethane acrylates, melamine acrylates, polyester acrylates, polyether acrylates, silicone acrylates, epoxy methacrylates, polyurethane methacrylates, melamine methacrylates, polyester methacrylates, polyether methacrylates, silicone methacrylates, unsaturated acrylic, methacrylic or polyester resins or mixtures of two or more of these compounds;

a UV-curing primer wherein, as reactive thinners, styrene, mono-, di-, tri- or tetrafunctional acrylates or mono-, di-, tri- or tetrafunctional methacrylates or mixtures of two or more of these are used;

a UV-curing primer wherein the UV initiator is selected from benzophenone, benzoin ether, benzil, benzine ketal, α-hydroxyalkylphenone, α-aminoalkylphenone, benzoyl phosphine oxide or derivatives thereof or mixtures of at least two or compounds and/or their derivatives;

a UV-curing primer wherein adhesion promoters may be used as additives;

a UV-curing primer wherein inorganic and/or organic colorants may be used for colouring and covering the substrate, for example white pigments, coloured pigments, black pigments and/or dyes;

a UV-curing primer wherein the anti-corrosive pigments are organic inhibitors or inorganic anti-corrosive pigments, e.g. metal phosphates, metal phosphosilicates or ion-exchange pigments, or mixtures of these compounds;

a process for the production of the primer according to the invention, wherein barium sulfate of the particle size according to the invention is added to and incorporated in a commercial UV-curing primer by methods according to the prior art;

a process for the production of the primer according to the invention, wherein barium sulfate of the particle size according to the invention is added to and incorporated in a UV-curing primer based on acrylates, preferably epoxy acrylates, urethane acrylates or mixtures of these acrylates, by methods according to the prior art;

a process for the coating of substrates with the primer according to the invention, wherein barium sulfate of the particle size according to the invention is added to and incorporated in a UV-curing primer based on acrylates, preferably epoxy acrylates, urethane acrylates or mixtures of these acrylates, by methods according to the prior art and the mixture is applied to the substrate and UV-cured;

a process for the coating of substrates with the primer according to the invention, wherein barium sulfate of the particle size according to the invention is added to and incorporated in a commercial UV-curing primer by methods according to the prior art and the mixture is applied to the substrate and UV-cured;

the use of the primer according to the invention for the coating of metallic surfaces, preferably of steel or aluminium, particularly preferably of planar metallic surfaces;

the use of the primer according to the invention for coil coating, can coating and/or container coating;

the use of the primer according to the invention for the coating of planar objects, preferably wooden boards, fibreboards such as MDF, laminates, paper and/or films;

the use of the primer according to the invention for the coating of substrates, wherein the substrate is pretreated with inorganic chemicals for corrosion protection, preferably finished electrolytically or by hot dipping, particularly preferably finished electrolytically or by hot dipping with zinc and/or zinc compounds;

the use of the primer according to the invention for the coating of substrates, wherein the substrate is pretreated with organic chemicals for corrosion protection;

the use of the primer according to the invention for the coating of substrates, wherein a pretreatment of the substrate for corrosion protection is dispensed with;

use of the substrates coated with the primer according to the invention and/or by the process according to the invention in construction, especially as add-on parts for roofs and facades, partition walls, ceiling elements, for shop fittings, cupboards, shelves, domestic appliances, machine casings, doors, gates, lights, wheel rims, as add-on parts for car bodies and caravans.

The invention is explained in more detail by the following examples, without being limited thereto:

EXAMPLE 1

General Formulations for Primers

TABLE 1

| General formulations for compositions; all contents given in percent by weight (wt. %) | | |
|---|---|---|
| Formulation | 1 | 2 |
| Acrylate binder | 70 | 63 |
| Monomers | 20 | 18 |
| Adhesion promoter | 5 | 4.5 |
| UV initiator | 5 | 4.5 |
| Barium sulfate | 0 | 10 |

The formulation constituents are predispersed for 10 minutes in a high-speed mixer and then dispersed in a Skandex or with a bead mill. In the laboratory, a 150 g batch of the composition is placed in a 500 ml Kautex bottle for this purpose with 500 g glass beads measuring 2 mm. The fineness of dispersion is then tested with a Hegmann gauge. The dispersing is continued until the desired fineness is achieved; in the present case after 3 hours' Skandex a fineness of less than or equal to 6 μm. A corresponding comparative sample (formulation 1) contains no barium sulfate.

Application and Testing:

The batch of primer screened off from the beads is applied on to freshly cleaned sheets (non-galvanised steel) using a wire-wound coating rod and irradiated with the UV curing device (Eltosh, 2 passes at 120 W/cm$^2$, 3 m/min).

With a 30 μm wire-wound coating rod, a coat thickness of 13 μm results.

The coat produced on the substrate with the primer based on formulation 2 displays a smoother surface and better flow than the coat produced on the substrate with the primer based on formulation 1. For adhesion and elasticity, no differences can be detected between the two coatings, both coatings behave very well in terms of adhesion and elasticity (ball impact, rapid deformation). In the elasticity test (indentation), the coat produced with the primer based on formulation 1 displays slightly better elasticity. The coat produced with the primer based on formulation 2, on the other hand, displays improved hardness (pendulum damping).

However, clear advantages can be seen here in terms of corrosion for the coat produced on the basis of formulation 2.

The corrosion test is repeated for a coat thickness of 50 μm. The results of the corrosion tests are presented in the following Table 2. The degree of rusting is evaluated in accordance with DIN 53210 and the degree of blistering in accordance with DIN 53209:

TABLE 2

Mechanical properties of the coatings produced
with the primers based on formulations 1 and 2

| Formulation | 1 | 2 |
|---|---|---|
| Cross-hatch adhesion | 0 | 0 |
| Erichsen indentation [mm] | 9.5 | 8.7 |
| Pendulum hardness [sec] | 85 | 105 |
| Ball impact inverse | >200 | >200 |
| Ball impact reverse | >200 | >200 |
| Salt spray test 50 h, 13 μm coat thickness, untreated steel: | | |
| Corrosion creep (mm) | 2 | 2 |
| Degree of rusting score | 5 | 1 |
| Degree of blistering | m5g2 | m2g2 |
| Salt spray test 400 h, 50 μm coat thickness, untreated steel: | | |
| Corrosion creep (mm) | 14 | 7 |
| Degree of rusting score | 4 | 0 to 1 |
| Degree of blistering | m4g3 | m1g2 |

FIG. 1 a) shows the result of the 50-hour salt spray test for a 13 μm coat thickness with the coat produced using the primer based on formulation 1; FIG. 1 b) shows the result of the 50-hour salt spray test for a 13 μm coat thickness with the coat produced using the primer based on formulation 2.

Figure 2:
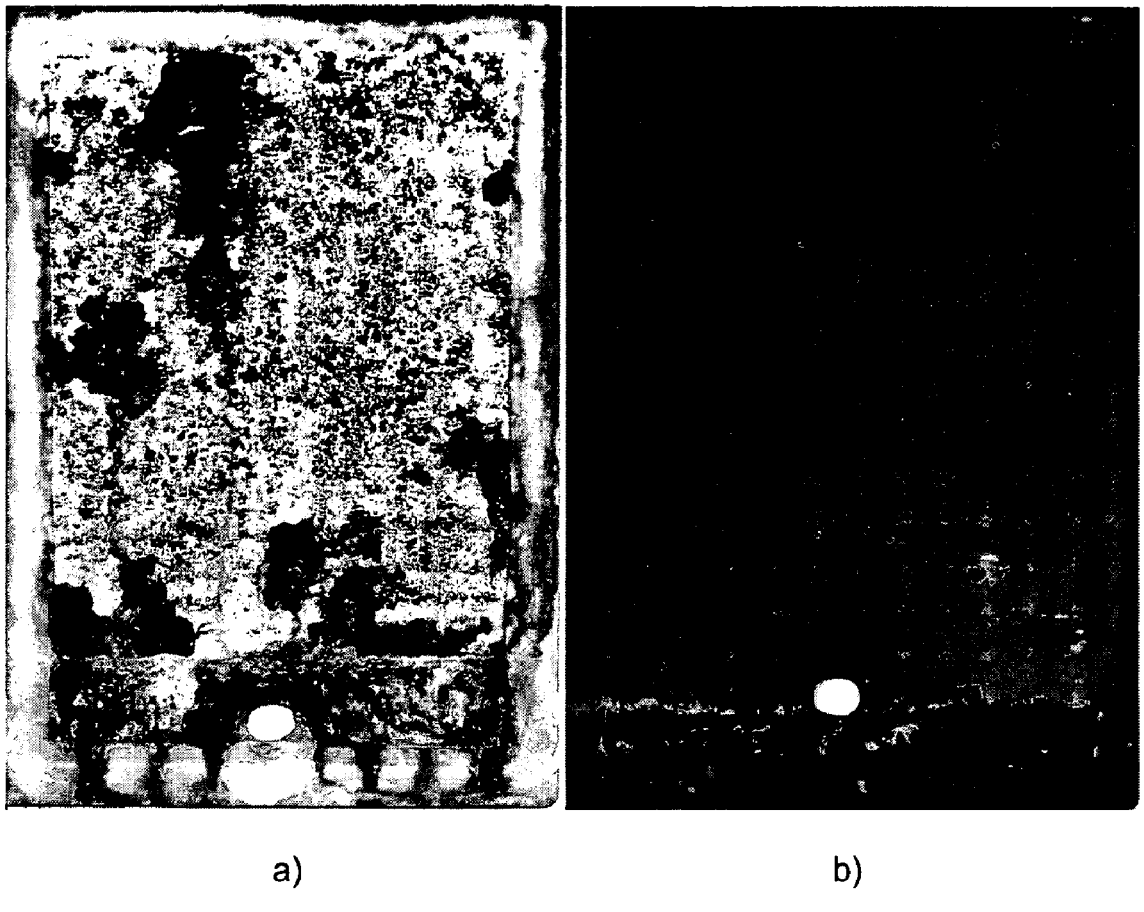

FIG. 2 a) shows the result of the 400-hour salt spray test for a 50 μm coat thickness with the coat produced using the primer based on formulation 1; FIG. 2 b) shows the result of the 400-hour salt spray test for a 50 μm coat thickness with the coat produced using the primer based on formulation 2.

EXAMPLE 2

Formulations for Primers Based on Epoxy Acrylate

Table 3 shows formulations for primers based on epoxy acrylate, Ebecryl EB 3213 (Cytec), 75%, with the content of barium sulfate adjusted to between 0 and 15%. The average particle size of the barium sulfate is 50 nm. DPGDA (dipropylene glycol diacrylate) and HDDA (hexanediol diacrylate) are reactive thinners; Ebecryl 171 (Cytec) is an adhesion promoter, HDMAP (2-hydroxy-2-methyl-propiophenone) is a radical photoinitiator. All contents are given in percent by weight (wt. %).

TABLE 3

Formulations for primers based on epoxy acrylate

| Formulation | 3 | 4 | 5 | 6 | 7 |
|---|---|---|---|---|---|
| Ebecryl EB 3213, 75% | 56.00 | 54.90 | 53.20 | 50.40 | 47.60 |
| DPGDA | 25.00 | 24.50 | 23.75 | 22.50 | 21.25 |
| HDDA | 9.00 | 8.80 | 8.55 | 8.10 | 7.65 |
| Ebecryl 171 | 5.00 | 4.90 | 4.75 | 4.50 | 4.25 |
| Additol HDMAP | 5.00 | 4.90 | 4.75 | 4.50 | 4.25 |
| Barium sulfate | 0 | 2 | 5 | 10 | 15 |

A 10 μm thick coat is produced on untreated steel plates as in the process described in example 1.

Table 4 shows the mechanical properties of the coats produced with the formulations listed in table 3:

TABLE 4

Mechanical properties of the coats produced with
the primers based on formulations 3 to 7

| Formulation | 3 | 4 | 5 | 6 | 7 |
|---|---|---|---|---|---|
| Cross-hatch adhesion | 4 | 4 | 3 | 1 | 0 |
| Pendulum hardness [sec] | 189 | 198 | 206 | 209 | 207 |
| Indentation [mm] | 5.2 | 5.2 | 5.2 | 5.3 | 5.4 |
| Ball impact inverse | 110 | 110 | 100 | 100 | 95 |
| Ball impact reverse | <10 | <10 | <10 | <10 | <10 |

Figure 3:
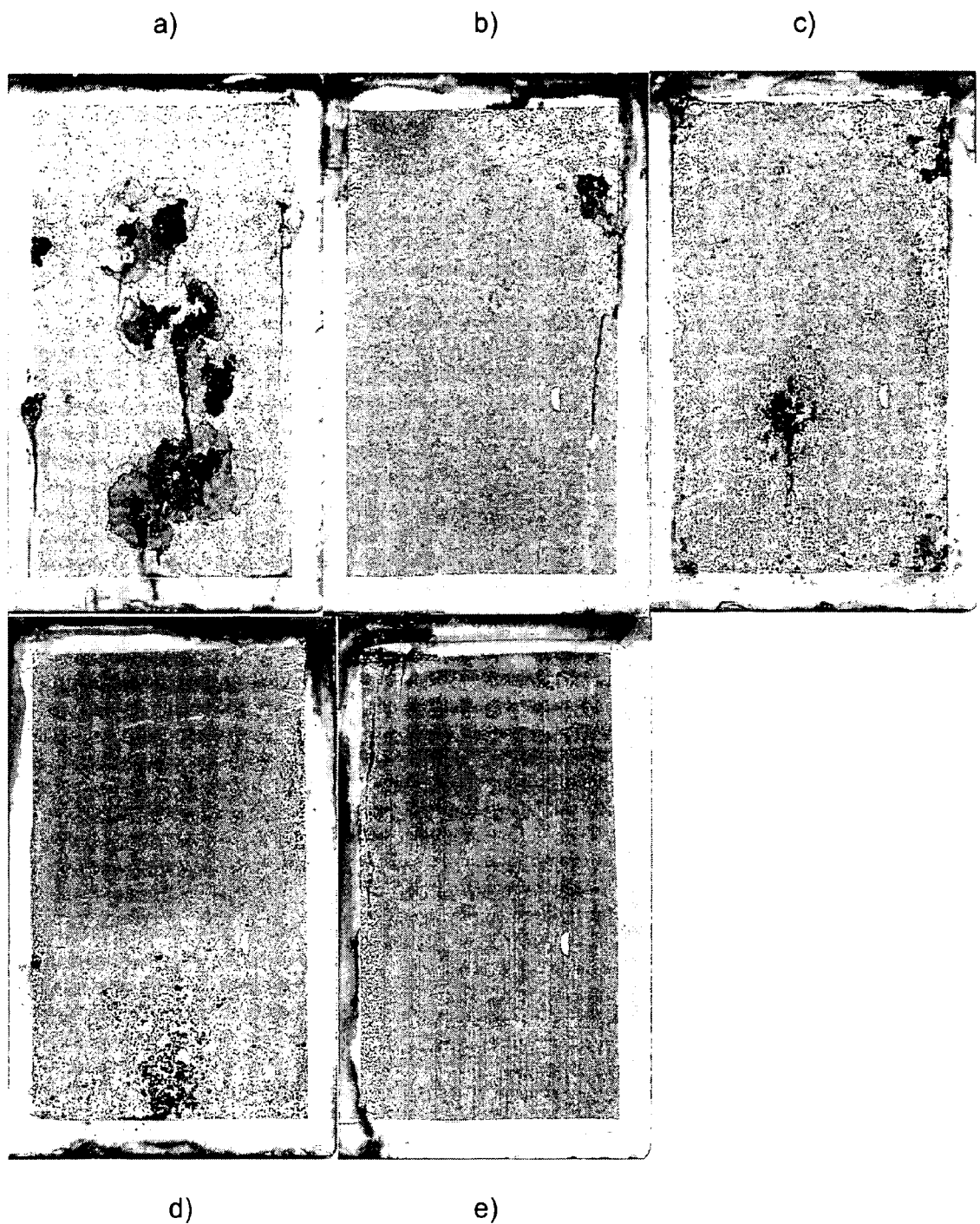

FIG. 3 shows the results of the corrosion protection test after 100 hours' corrosion testing on untreated steel with a 10 μm coat thickness:

FIG. 3 a) Formulation 3;
FIG. 3 b) Formulation 4;
FIG. 3 c) Formulation 5;
FIG. 3 d) Formulation 6;
FIG. 3 e) Formulation 7.

Figure 4:
Figure 4:
Figure 4:
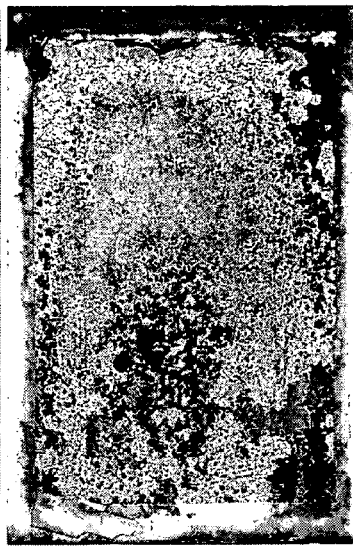
Figure 4:
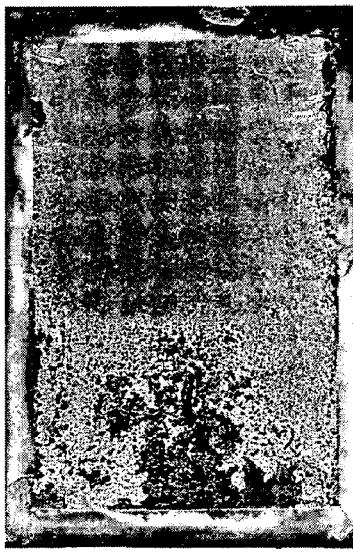
Figure 4:
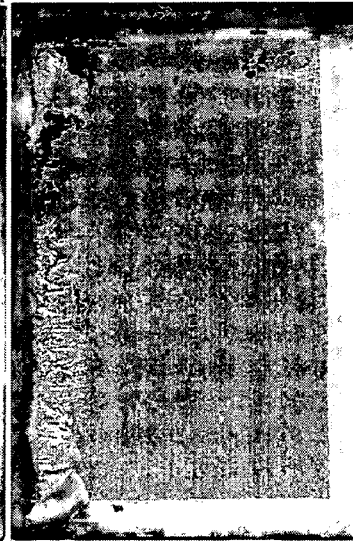

FIG. 4 shows the results of the corrosion protection test after 150 hours' corrosion testing on untreated steel with a 10 μm coat thickness:

FIG. 4 a) Formulation 3;
FIG. 4 b) Formulation 4;
FIG. 4 c) Formulation 5;
FIG. 4 d) Formulation 6;
FIG. 4 e) Formulation 7.

The evaluation of the test shows that the use of the primers according to the invention improves the mechanical properties and the corrosion protection of the substrates coated therewith as follows:

- with an increasing content of barium sulfate, the cross hatch adhesion improves from 4=poor to 0=very good. This means that the adhesion to the substrate of the coat produced according to the invention is continuously improved;
- the pendulum damping increases slightly with the barium sulfate concentration. This means that the coat becomes a little harder. The UV curing process was not negatively affected; the solids introduced do not therefore reduce the crosslinking of the binder;
- the Erichsen indentation remains constant even with the addition of barium sulfate, i.e. the elasticity of the coat is not altered;
- as can be seen from FIGS. 3 and 4, the corrosion protection is significantly improved with an increasing barium sulfate content.

EXAMPLE 3

Formulations for Coating Compositions Based On Urethane Acrylate

Table 5 shows formulations for primers based on urethane acrylate, Ebecryl EB 8307 (Cytec), 70%. The barium sulfate content is adjusted to 0 and 10%. The average particle size of the barium sulfate is 50 nm. All contents are given in percent by weight (wt. %).

TABLE 5

Formulations for primers based on urethane acrylate

| Formulation | 8 | 9 |
|---|---|---|
| Ebecryl EB 8307, 70% | 56.00 | 50.40 |
| DPGDA | 25.00 | 22.50 |

TABLE 5-continued

Formulations for primers based on urethane acrylate

| Formulation | 8 | 9 |
|---|---|---|
| HDDA | 9.00 | 8.10 |
| Ebecryl 171 | 5.00 | 4.50 |
| Additol HDMAP | 5.00 | 4.50 |
| Barium sulfate | 0 | 10 |

A 10-μm-thick coat is produced on untreated steel plates as in the process described in example 1.

Table 6 shows the mechanical properties of the coats produced with primers based on the formulations listed in table 5:

TABLE 6

Mechanical properties of the coats produced with formulations 8 and 9:

| Formulation | 8 | 9 |
|---|---|---|
| Cross-hatch adhesion | 0 | 0 |
| Pendulum hardness [sec] | 76 | 80 |
| Indentation [mm] | 8.2 | 8.3 |
| Ball impact inverse | >200 | >200 |
| Ball impact reverse | >200 | >200 |

Figure 5:
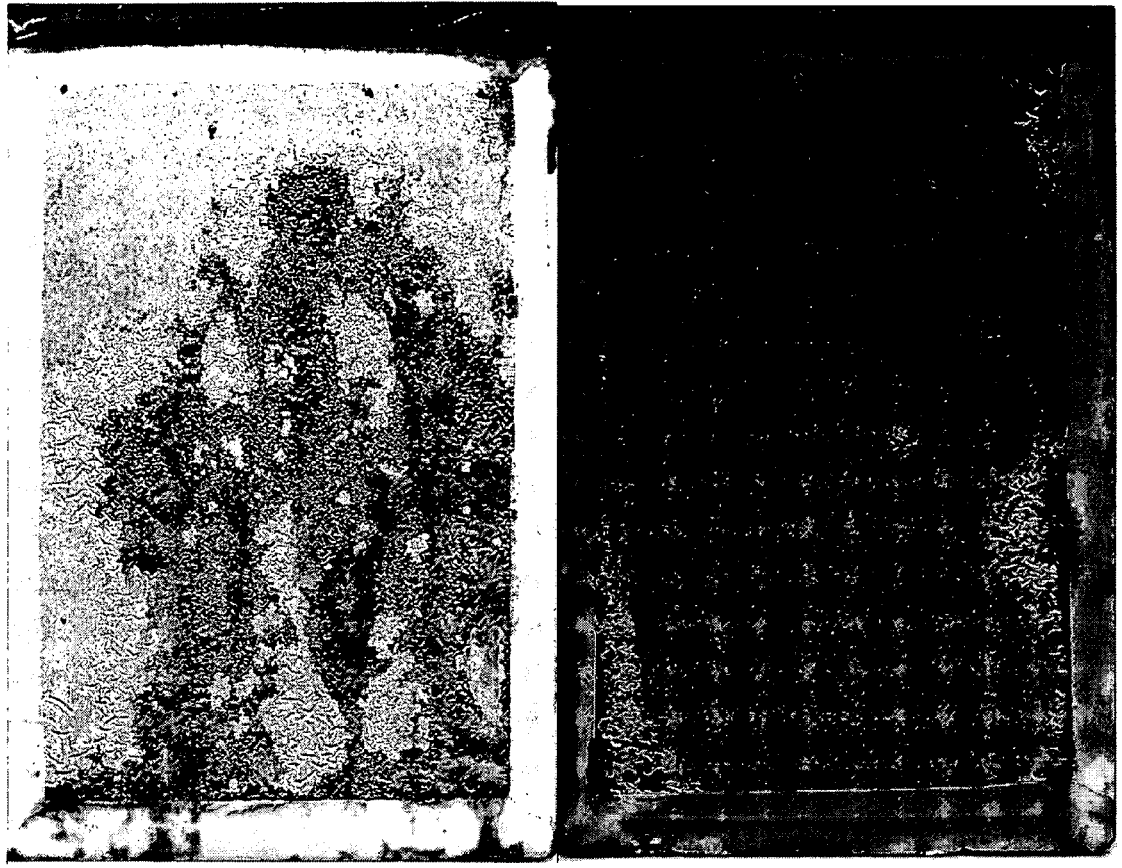
Figure 6:
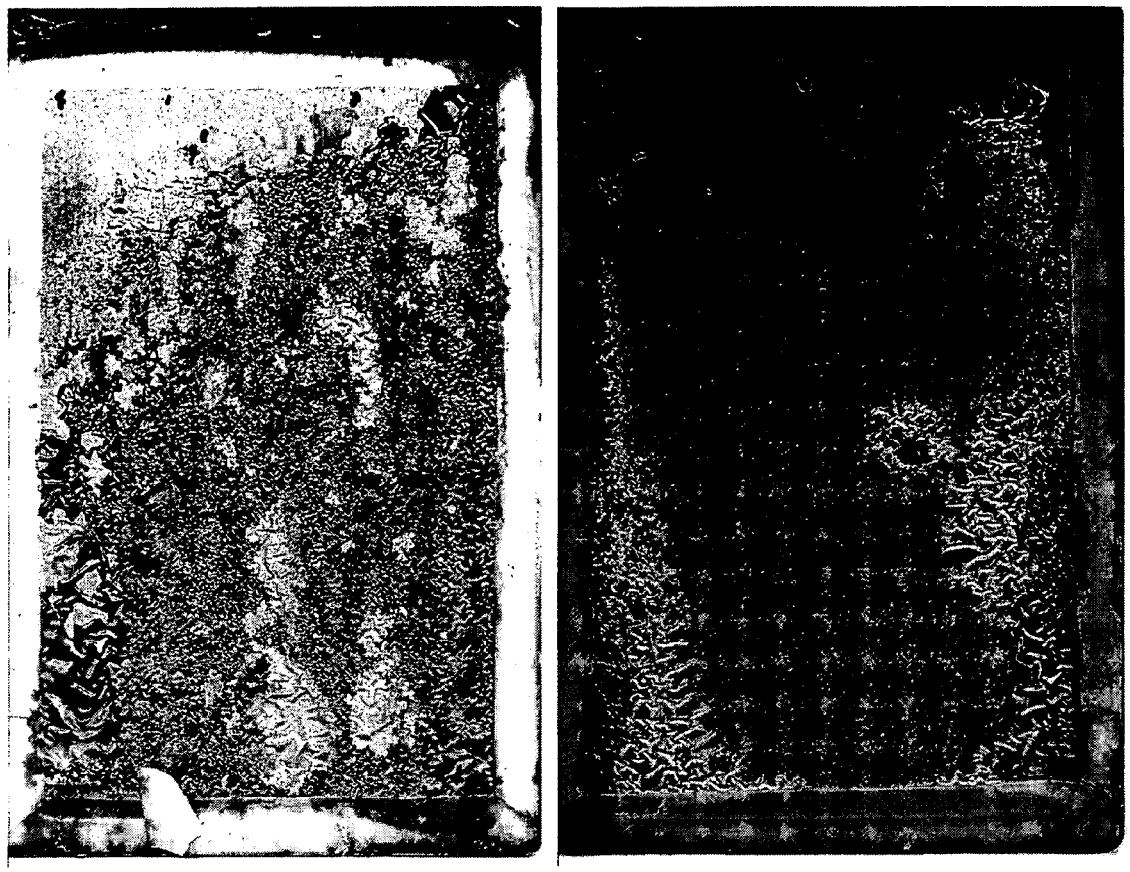

FIG. 5 shows the results of the corrosion protection test after 100 hours' corrosion testing on untreated steel with a 10 μm coat thickness:
FIG. 5 a) Formulation 8;
FIG. 5 b) Formulation 9;
FIG. 6 shows the results of the corrosion protection test after 150 hours' corrosion testing on untreated steel with a 10 μm coat thickness:
FIG. 6 a) Formulation 8;
FIG. 6 b) Formulation 9;

The evaluation of the test shows that the use of the primers according to the invention improves the mechanical properties and the corrosion protection of the substrates coated therewith as follows:
- the cross-hatch adhesion in the test with formulation 9 is very good with a result of 0, as in the test with formulation 8; this means that the adhesion of the primer according to the invention to the substrate is excellent and is not negatively affected by the addition of barium sulfate;
- all other mechanical data, such as pendulum damping, Erichsen indentation and ball impact, also remain at an unchanged level when the barium sulfate is added; the very high elasticity can be seen from the high indentation values and low pendulum hardnesses; the very good adhesion is also shown by the ball impact.
- as can be seen from FIGS. 5 and 6, the corrosion protection is significantly improved by the use of barium sulfate.

EXAMPLE 4

Formulation Based On Formulation 1 On Galvanised Steel

A formulation 10 based on formulation 1 is produced with the addition of 5 wt % barium sulfate as in the process described in example 1. The average particle size of the barium sulfate is 50 nm. Also as in example 1, a 10 μm thick coat both, without barium sulfate (formulation 1) and with barium sulfate (formulation 10), is produced on galvanised steel sheets. The coatings are then scratched along the length in order to simulate damage.

Figure 7:
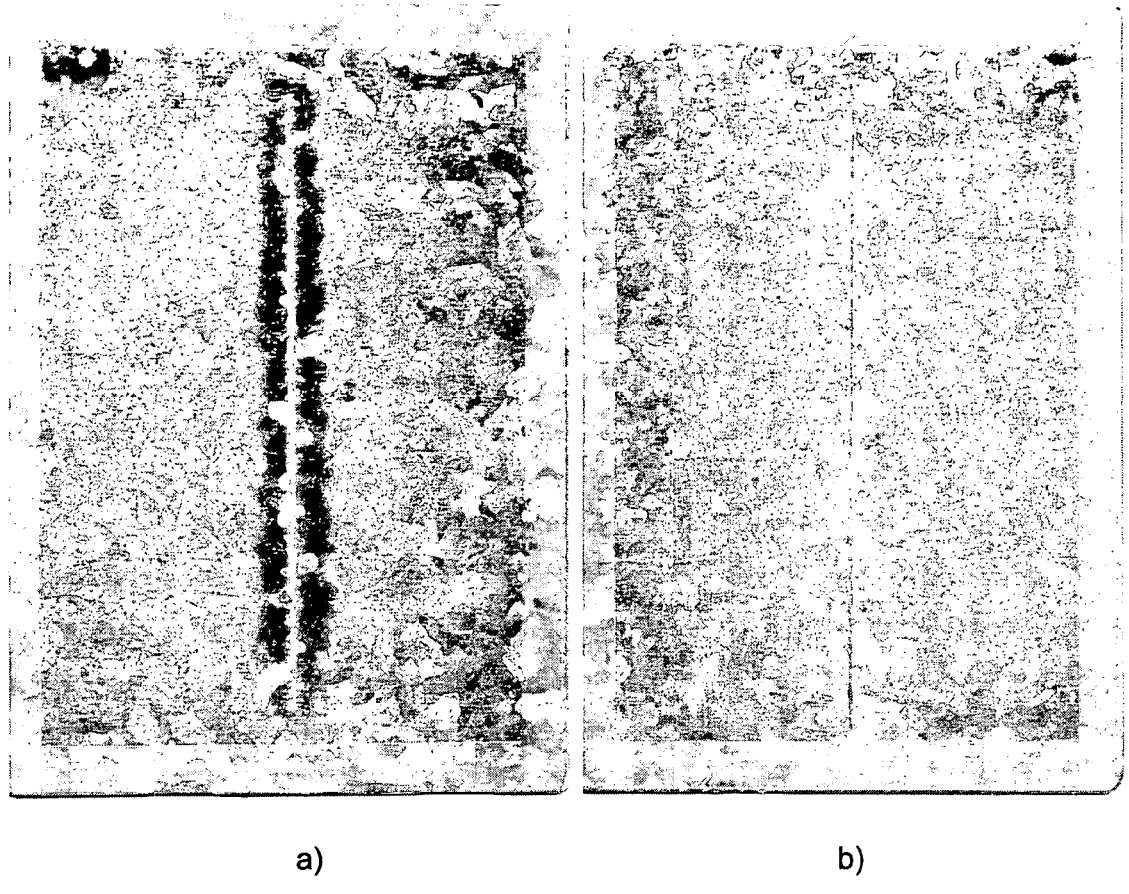

FIG. 7 shows the results of the corrosion protection test after 150 hours of corrosion testing on galvanised steel with a 10 μm coat thickness:
FIG. 7a) formulation 1;
FIG. 7b) formulation 10.

The evaluation of the test shows that the primers according to the invention significantly reduce creep corrosion along the scratch.

EXAMPLE 5

Combination of a UV-curing Primer Formulation with 10 wt. % of an Active Anti-corrosive Pigment

TABLE 7

Formulations for primers based on Laromer binder (BASF) with 10 wt. % of an active anti-corrosive pigment, all contents in wt. %

| | Formulation | | | | |
|---|---|---|---|---|---|
| Variant | 11 Reference | 11 (a) | 11 (b) | 11 (c) | 11 (d) |
| Laromer UA9033 V | 38.13 | 36.00 | 33.90 | 31.77 | 29.65 |
| Laromer PA 9039 V | 8.13 | 7.68 | 7.22 | 6.77 | 6.32 |
| Laromer TBCH | 30.80 | 29.09 | 27.38 | 25.67 | 23.96 |
| Byk 020 | 0.20 | 0.19 | 0.18 | 0.17 | 0.16 |
| Shieldex C 303 | 10.00 | 10.00 | 10.00 | 10.00 | 10.00 |
| Irgacure 184 | 8.12 | 7.68 | 7.22 | 6.77 | 6.32 |
| Genocure MBF | 4.62 | 4.36 | 4.10 | 3.85 | 3.59 |
| Barium sulfate | 0 | 5.00 | 10.00 | 15.00 | 20.00 |

Figure 8:
Figure 9:
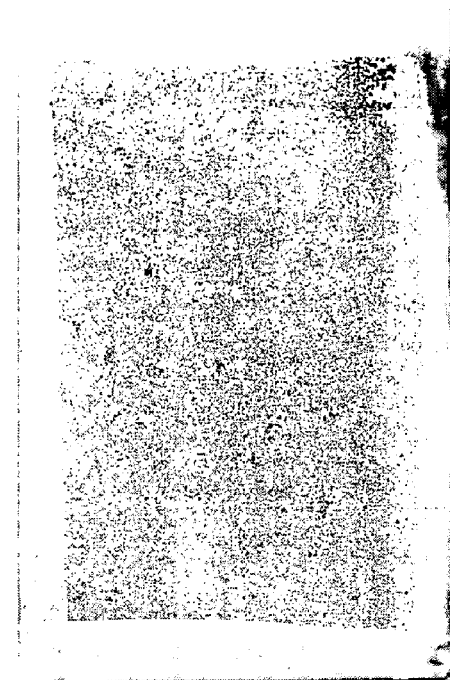
Figure 9:
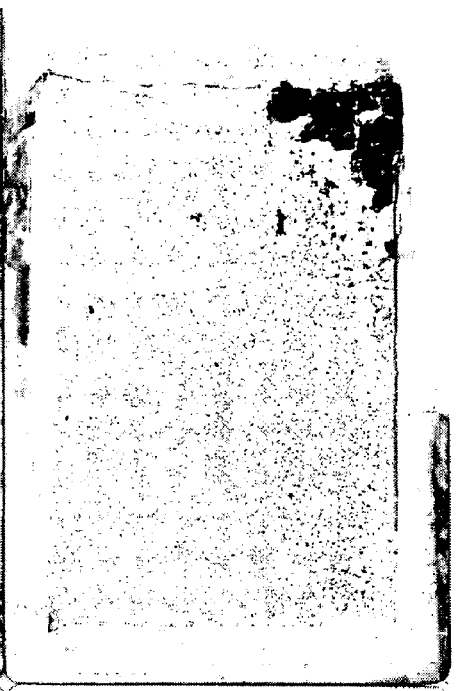
Figure 9:
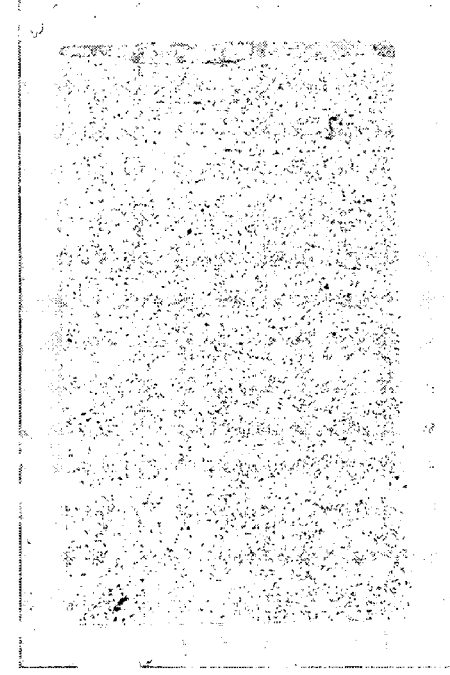
Figure 9:
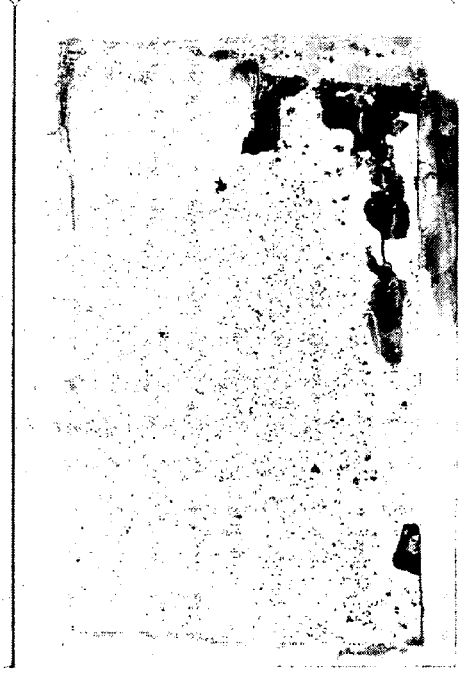
Figure 10:
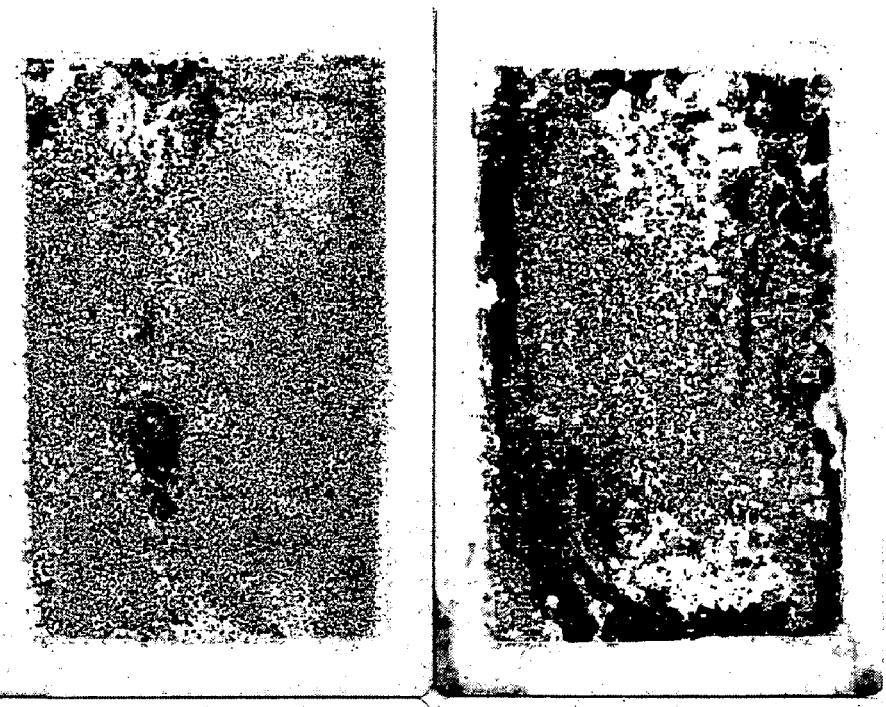
Figure 10:
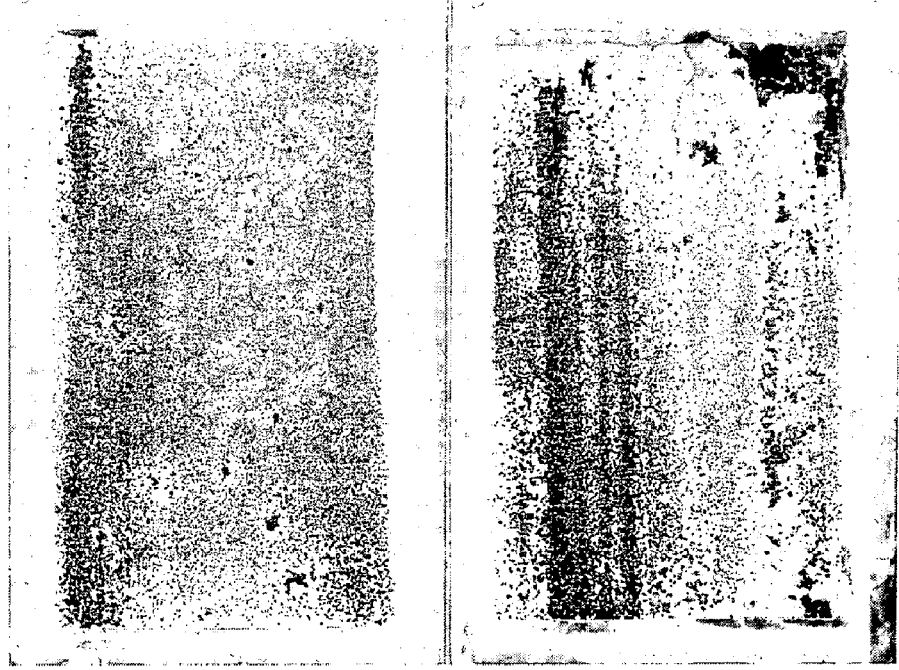
Figure 11:
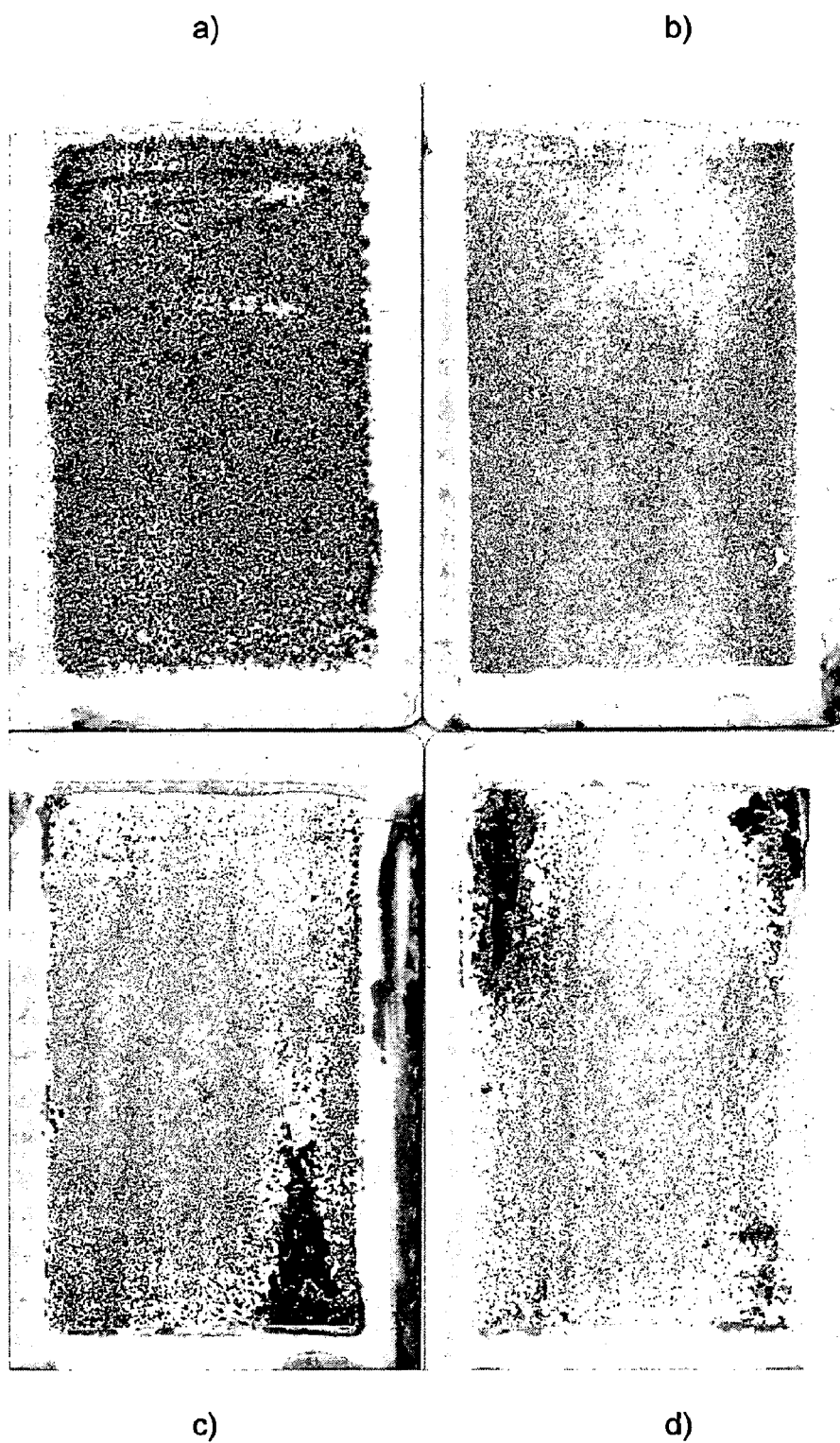
Figure 12:
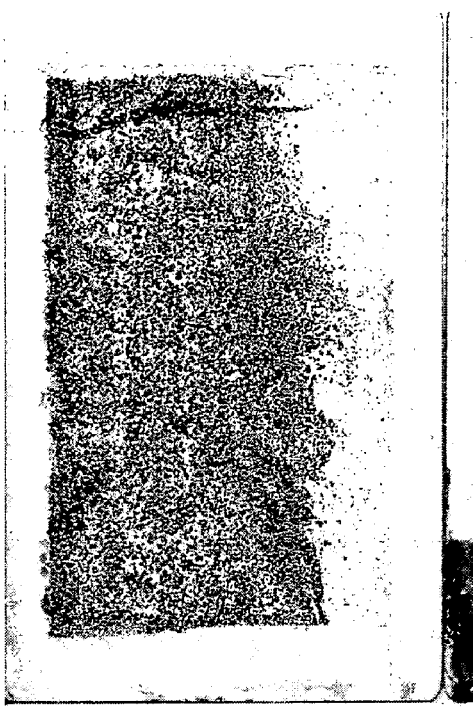
Figure 12:
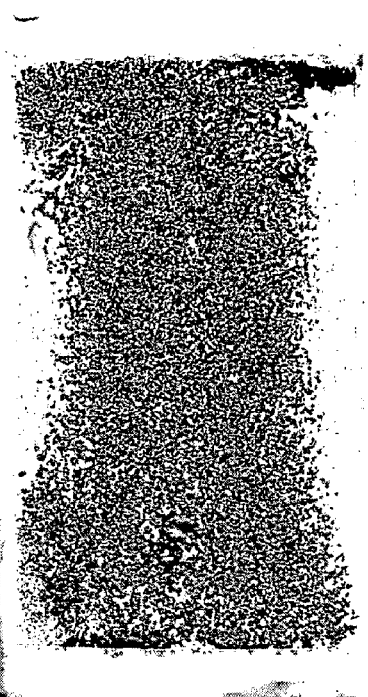
Figure 12:
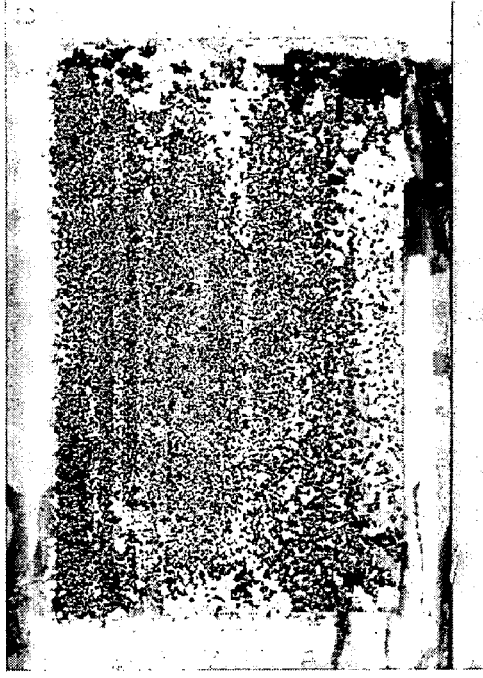
Figure 12:

In another UV-curing primer formulation (formulation 11, reference) with Laromer binders and monomer (both BASF), barium sulfate with different particle sizes is mixed in using a bead mill in varying proportions of 5, 10, 15 and 20 wt. % (variants (a)-(d)). This formulation additionally contains as a constant constituent 10 wt. % Shieldex C 303 (Grace) as an active anti-corrosive pigment. Untreated steel sheets are coated in a thickness of 10 μm and tested for 75 hours in a salt spray test. The results are shown by the following Figures, with 5 wt. % barium sulfate top left (a), 10 wt. % barium sulfate top right (b), 15 wt. % barium sulfate bottom left (c) and 20 wt. % barium sulfate bottom right (d) in each illustration:

FIG. 8: Formulation 11, reference, only Shieldex;
FIG. 9: Barium sulfate with 50 nm average particle size;
FIG. 10: Barium sulfate with 500 nm average particle size;
FIG. 11: Barium sulfate with 700 nm average particle size;
FIG. 12: Barium sulfate with 1000 nm average particle size;

The Figures show that corrosion protection is improved by the use of barium sulfate. With an increasing content of barium sulfate, the protective effect improves. A barium sulfate with an average particle size of 700 nm displays a greater action than one with an average particle size of 1000 nm or 500 nm. A barium sulfate with an average particle size of 50 nm displays a greater action than one with an average particle size of 1000 nm or 500 nm.

EXAMPLE 6

Combination of a UV-curing Primer Formulation with 5 wt. % of an Active Anti-corrosive Pigment

TABLE 8

Formulations for primers based on Laromer binders (BASF) with 5 wt. % of an active anti-corrosive pigment, all contents in wt. %

| Formulation | 12 |
| --- | --- |
| Laromer UA9033 V | 36.00 |
| Laromer PA 9039 V | 7.68 |
| Laromer TBCH | 29.09 |
| Byk 020 | 0.19 |
| Shieldex C 303 | 5.00 |
| Irgacure 184 | 7.68 |
| Genocure MBF | 4.36 |
| Barium sulfate | 10 |

In a UV-curing primer formulation (formulation 12) with Laromer binders and monomer (both BASF), barium sulfate with different particle sizes is mixed in using a bead mill in a proportion of 10 wt. % in each case. This formulation contains as a constant constituent 5 wt. % Shieldex C 303 (Grace) as an active anti-corrosive pigment. Untreated steel sheets are coated in a thickness of 10 μm and tested for 75 hours in a salt spray test.

Figure 13:
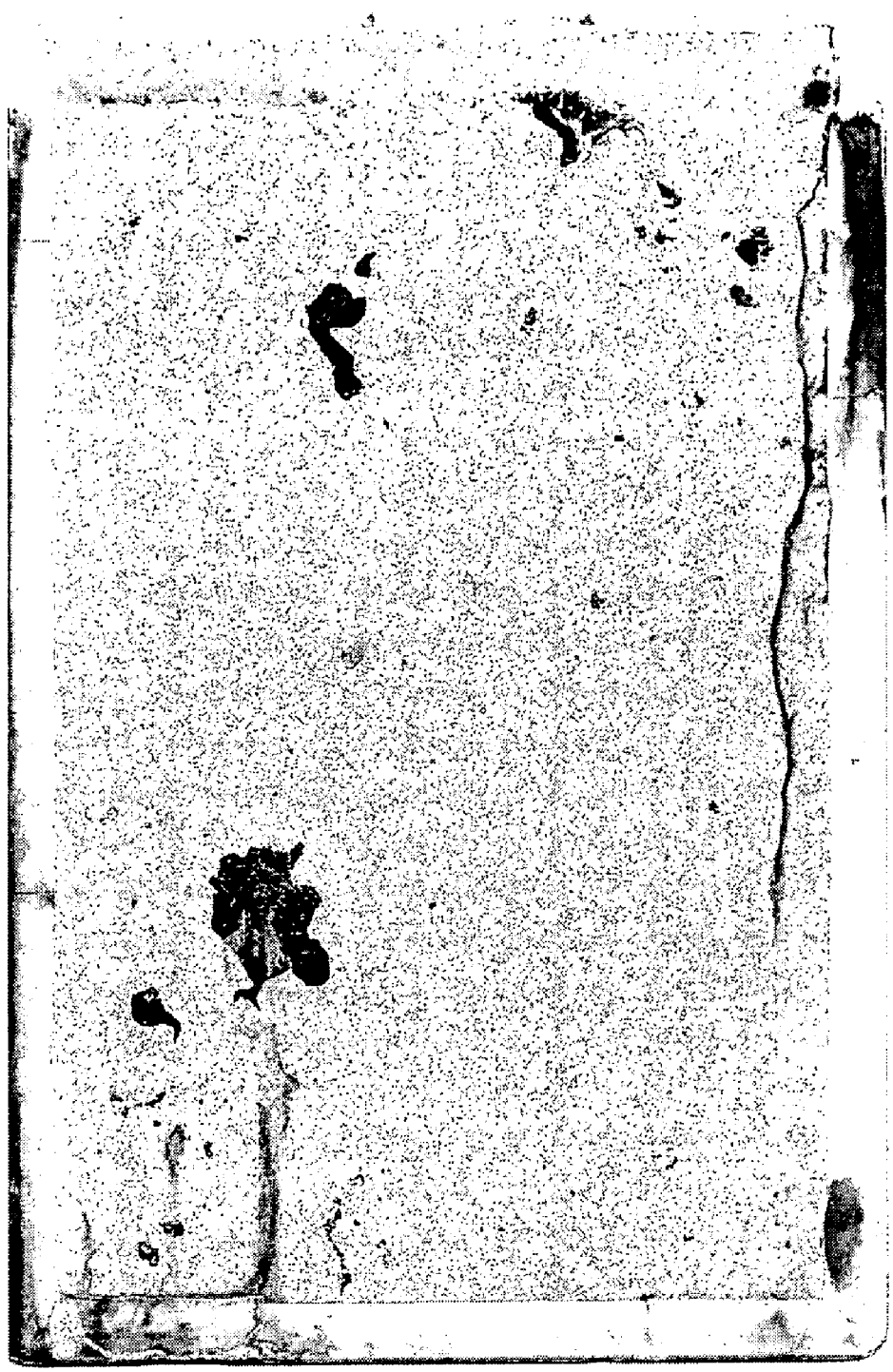
Figure 14:

FIG. 13: Formulation 12 with barium sulfate with 700 nm average particle size;

FIG. 14: Formulation 12 with barium sulfate with 500 nm average particle size.

Example 6 confirms the result obtained in example that the use of barium sulfate with an average particle size of 700 nm is more advantageous than the use of barium sulfate with an average particle size of 500 nm.

EXAMPLE 7

UV-curing Primer Formulation without an Active Anti-corrosive Pigment

TABLE 9

Formulations for primers based on Laromer binders (BASF) without an active anti-corrosive pigment, all contents in wt. %

| Formulation | 13 |
| --- | --- |
| Laromer UA9033 V | 38.13 |
| Laromer PA 9039 V | 8.13 |
| Laromer TBCH | 30.80 |
| Byk 020 | 0.20 |
| Shieldex C 303 | 0 |
| Irgacure 184 | 8.12 |
| Genocure MBF | 4.62 |
| Barium sulfate | 10 |

In a UV-curing primer formulation (formulation 13) with Laromer binders and monomer (both BASF), barium sulfate with different particle sizes is mixed in using a bead mill in a proportion of 10 wt. % in each case. This formulation contains no active anti-corrosive pigment. Untreated steel sheets are coated in a thickness of 10 μm and tested for 75 hours in a salt spray test.

Figure 15:
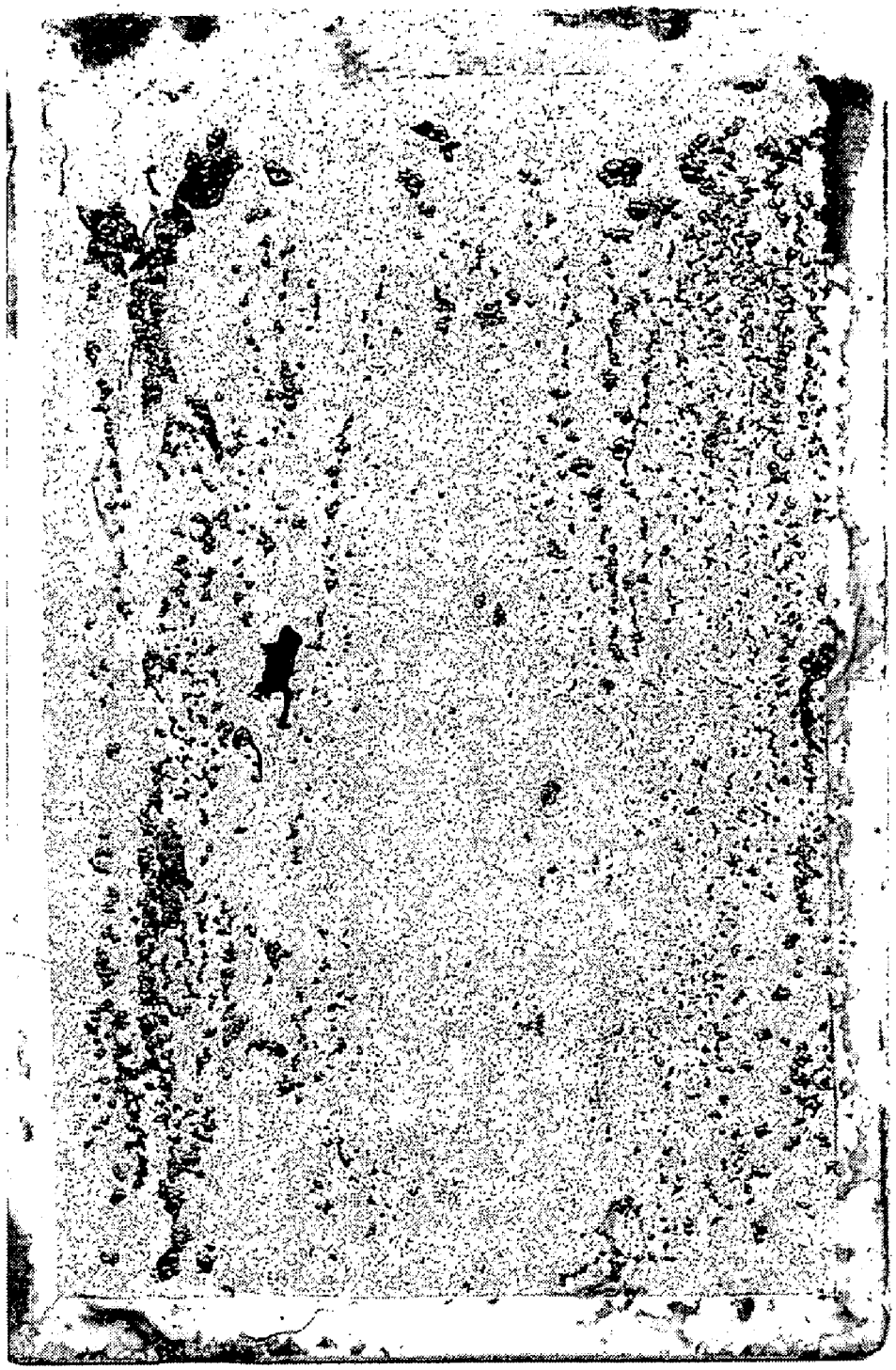
Figure 16:
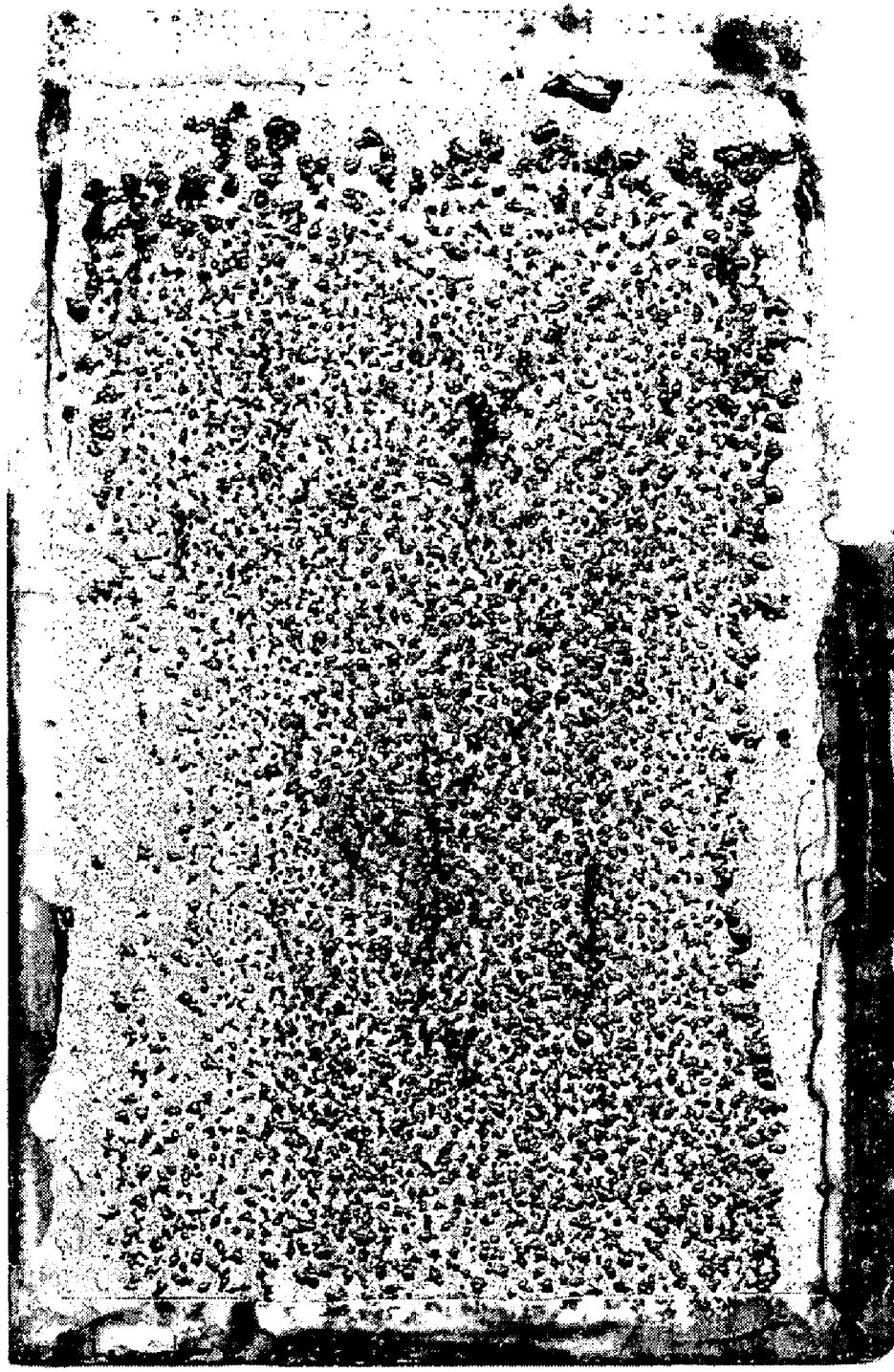

FIG. 15: Formulation 13 with barium sulfate with 700 nm average particle size;

FIG. 16: Formulation 13 with barium sulfate with 500 nm average particle size.

The test shows that the corrosion protection effect in the binder formulation employed is attributable solely to the use of barium sulfate.

EXAMPLE 8

Different Particle Sizes of Barium Sulfate

Formulations based on the formulations of example 2 were produced with the addition of 5 wt. % (formulation 5, (a) in each of the Figures), 10 wt. % (formulation 6, (b) in each of the Figures) and 15 wt. % (formulation 7, (c) in each of the Figures) of different barium sulfates as in the process described in example 2. The average particle size of the barium sulfate varied from 50 nm to 1000 nm. Also as in example 2, a 10-μm-thick coat of each formulation was produced on untreated steel sheets. FIGS. 17 to 22 show the results of the corrosion protection test after 100 hours of corrosion testing.

Figure 17:
Figure 18:
Figure 18:
Figure 18:
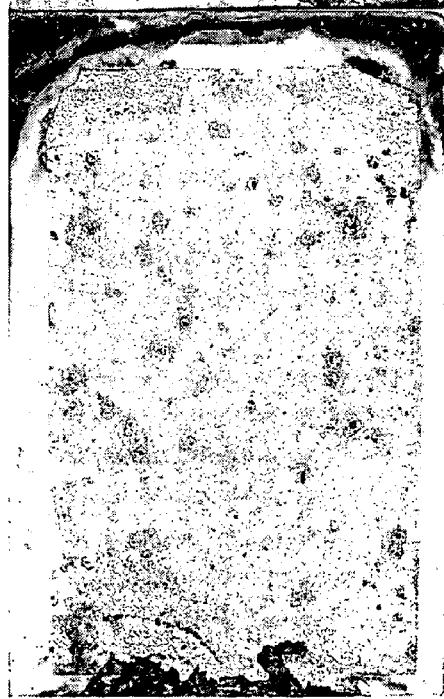
Figure 19:
Figure 19:
Figure 19:
Figure 20:
Figure 20:
Figure 20:
Figure 21:
Figure 21:
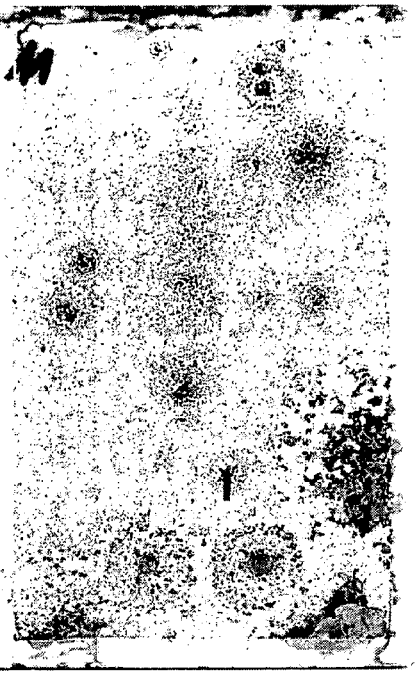
Figure 21:
Figure 22:
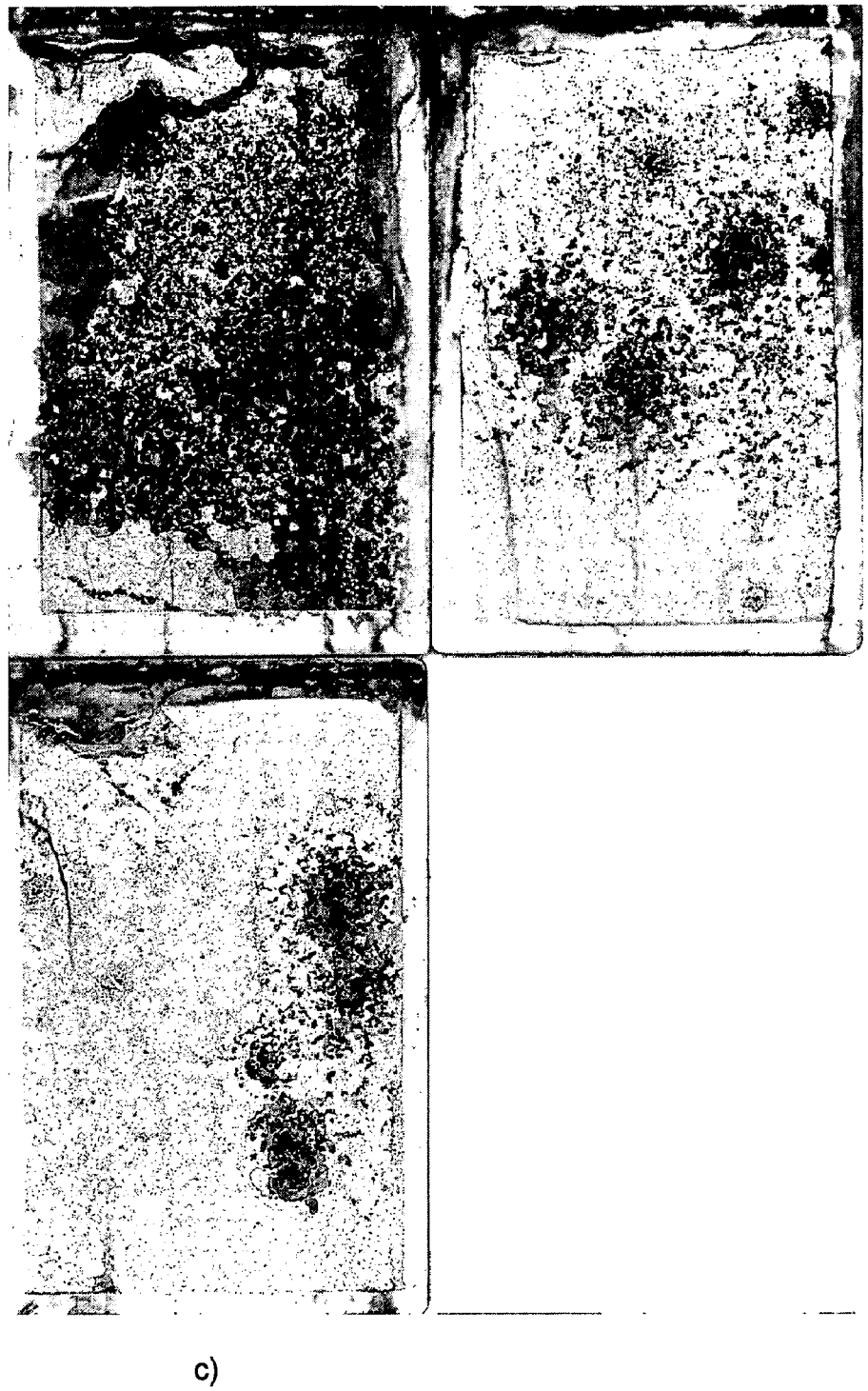

FIG. 17: Reference without barium sulfate (formulation 3);
FIG. 18: Barium sulfate with 50 nm average particle size;
FIG. 19: Barium sulfate with 200 nm average particle size;
FIG. 20: Barium sulfate with 500 nm average particle size;
FIG. 21: Barium sulfate with 700 nm average particle size;
FIG. 22: Barium sulfate with 1000 nm average particle size.

The evaluation of the test shows that the primers according to the invention are particularly advantageous in corrosion protection when the barium sulfates employed have particle sizes in ranges that are significantly lower than 200 nm or between 500 nm and 1000 nm.

The invention claimed is:

1. A UV-curing primer comprising barium sulfate having an average particle size of 10 to 120 nm, a binder, an UV initiator, and a reactive thinner, wherein the binder is from 40 to 80 wt. %, the reactive thinner is from 20 to 45 wt. %, the UV initiator is from 2 to 10 wt. %, and the barium sulfate is from 1 to 25 wt. %.

2. An UV-curing primer according to claim 1, wherein the binder comprises a compound with one or more UV-curing acrylate or methacrylate function.

3. An UV-curing primer according to claim 1, wherein the binder comprises at least one member selected from the group consisting of an epoxy acrylate, a polyurethane acrylate, a melamine acrylate, a polyester acrylate, a polyether acrylate, a silicone acrylate, an epoxy methacrylate, a polyurethane methacrylate, a melamine methacrylate, a polyester methacrylate, a polyether methacrylate, a silicone methacrylate, an unsaturated acrylic resin, an unsaturated methacrylic resin and a polyester resin.

4. An UV-curing primer according to claim 1, wherein the reactive thinners comprises at least one of styrene, a monofunctional acrylate, a di-functional acrylate, a tri-functional acrylate, a tetra-functional acrylate, a mono-functional methacrylate, a di-functional methacrylate, a tri-functional methacrylate or a tetra-functional methacrylate.

5. An UV-curing primer according to claim 1, wherein the UV initiator comprises at least one of benzophenone, benzoin ether, benzil, a benzine ketal, α-hydroxyalkylphenone, α-aminoalkylphenone, a benzoyl phosphine oxide or a derivative thereof.

6. An UV-curing primer according to claim 1, comprising an adhesion promoter.

7. An UV-curing primer according to claim 1, further comprising at least one of an inorganic or an organic colorant.

8. An UV-curing primer according to claim 1, further comprising an anti-corrosive pigment wherein the anti-corrosive pigment is an organic inhibitors or an inorganic anti-corrosive pigment.

9. A process for the production of a UV-curing primer according to claim 1 wherein the barium sulfate is admixed with a coating composition comprising an acrylate.

10. A process according to claim 9, wherein the particle size range of barium sulfate is from 30 to 80 nm.

11. A UV-curing primer prepared by the process of claim obtainable according to claim 10.

12. A process comprising coating a surface with a UV-curing primer according to claim 1 and UV curing the coating to form a cured coating on the surface.

13. A process according to claim 12, wherein the surface is metallic.

14. A coated substrate coated with the UV-curing primer according to claim 1, wherein the coating is cured with UV radiation.

15. The coated substrate of claim 14, which is a metal coil, a can or a container.

16. The coated substrate of claim 14, wherein the substrate is pretreated with an inorganic chemical for corrosion protection.

17. The coated substrate of claim 14, wherein the substrate is planar.

18. The coated substrate of claim 14, wherein the substrate is pretreated with an organic chemical for corrosion protection.

19. The UV-curing primer of claim 1, wherein the particle size range is from 20 to 100 nm.

20. The UV-curing primer of claim 19, wherein the particle size range is from 30 to 80 nm.

21. The UV-curing primer of claim 19, wherein the particle size range is from 40 to 60 nm.

22. The UV-curing primer of claim 1, further comprising at least one of a an additive, a colored pigment or an anti-corrosive agent.

* * * * *